United States Patent
Ardö et al.

(10) Patent No.: US 12,125,273 B2
(45) Date of Patent: Oct. 22, 2024

(54) METHOD, DEVICE, AND SYSTEM FOR PROCESSING IMAGE DATA REPRESENTING A SCENE FOR EXTRACTING FEATURES

(71) Applicant: Axis AB, Lund (SE)

(72) Inventors: Björn Ardö, Lund (SE); Anton Jakobsson, Lund (SE)

(73) Assignee: AXIS AB, Lund (SE)

( * ) Notice: Subject to any disclaimer, the term of this patent is extended or adjusted under 35 U.S.C. 154(b) by 272 days.

(21) Appl. No.: 17/510,407

(22) Filed: Oct. 26, 2021

(65) Prior Publication Data

US 2022/0171978 A1    Jun. 2, 2022

(30) Foreign Application Priority Data

Nov. 27, 2020    (EP) .................................... 20210295

(51) Int. Cl.
   *G06K 9/00*    (2022.01)
   *G06K 9/20*    (2006.01)
   (Continued)

(52) U.S. Cl.
   CPC ............ *G06V 10/95* (2022.01); *G06V 10/147* (2022.01); *G06V 10/25* (2022.01); *G06V 10/462* (2022.01)

(58) Field of Classification Search
   CPC .... G06F 18/251; G06V 10/147; G06V 10/25; G06V 10/454; G06V 10/462;
   (Continued)

(56) References Cited

U.S. PATENT DOCUMENTS

| 2013/0044940 A1 | 2/2013 | Cohen et al. |
| 2019/0005358 A1* | 1/2019 | Pisoni .................... G06V 10/82 |
| 2020/0013154 A1 | 1/2020 | Jang |

FOREIGN PATENT DOCUMENTS

| CN | 108228969 A | 6/2018 |
| KR | 20160064831 A | 6/2016 |
| WO | 2020/027607 A1 | 2/2020 |

OTHER PUBLICATIONS

Nie et al., "A View-Free Image Stitching Network based on Global Homography", Journal of Visual Communication and Image Representation, vol. 73, Nov. 4, 2020, pp. 1-9. (Year: 2020).*

(Continued)

*Primary Examiner* — Michael J Vanchy, Jr.
(74) *Attorney, Agent, or Firm* — XSENSUS LLP

(57) ABSTRACT

A method (100), a device (600;700) and a system (800) for processing image data representing a scene for extracting features related to objects in the scene using a convolutional neural network are disclosed. Two or more portions of the image data representing a respective one of two or more portions of the scene are processed (S110), by means of a respective one of two or more circuitries, through a first number of layers of the convolutional neural network to form two or more outputs, wherein the two or more portions of the scene are partially overlapping. The two or more outputs are combined (S120) to form a combined output, and the combined output is processed (S130) through a second number of layers of the convolutional neural network by means of one of the two or more circuitries for extracting features related to objects in the scene.

15 Claims, 7 Drawing Sheets

(51) Int. Cl.
   *G06K 9/32* (2006.01)
   *G06K 9/46* (2006.01)
   *G06V 10/147* (2022.01)
   *G06V 10/25* (2022.01)
   *G06V 10/46* (2022.01)
   *G06V 10/94* (2022.01)

(58) Field of Classification Search
   CPC .... G06V 10/764; G06V 10/803; G06V 10/95; G06V 20/695
   See application file for complete search history.

(56) References Cited

OTHER PUBLICATIONS

Sumantri et al., "360 Panorama Synthesis from a Sparse Set of Images on a Low-Power Device", IEEE Transactions on Computational Imaging, vol. 6, Jul. 24, 2020, pp. 1179-1193.

Nie et al., "A View-Free Image Stitching Network based on Global Homography", Journal of Visual Communication and Image Representation, vol. 73, Nov. 4, 2020, pp. 1-9.

* cited by examiner

METHOD, DEVICE, AND SYSTEM FOR PROCESSING IMAGE DATA REPRESENTING A SCENE FOR EXTRACTING FEATURES

CROSS-REFERENCE TO RELATED APPLICATION

This application claims priority from European Patent Application No. 20210295.0, filed on Nov. 27, 2020, the contents of which are incorporated by reference herein in its entirety.

TECHNICAL FIELD

The present invention relates to image processing, and specifically to capturing and processing image data representing a scene for extracting features related to objects in the scene using a convolutional neural network.

BACKGROUND

Convolutional neural networks may be used when processing an image of a scene to extract features related to objects in the scene. In such processing, the number of calculations required is substantially increased with increased size, i.e. number of pixels, of the image. Hence, the processing time will be substantially increased with increased size of the image. Examples of such large images are high resolution images and panoramic images representing a wide scene. One way of reducing the number of calculations is to reduce the resolution of the image to be processed. However, this will reduce the possibility to extract small features related to objects in the scene.

SUMMARY OF THE INVENTION

An object of the present invention is to facilitate time-efficient processing of image data representing a scene for extracting features related to objects in the scene whilst maintaining the possibility to extract small features related to objects in the scene.

According to a first aspect, a method of processing image data representing a scene for extracting features related to objects in the scene using a convolutional neural network is provided. The method comprises processing, by means of a respective one of two or more circuitries, two or more portions of the image data representing a respective one of two or more portions of the scene through a first number of layers of the convolutional neural network to form two or more outputs, wherein the two or more portions of the scene are partially overlapping. The method further comprises combining the two or more outputs to form a combined output, and processing the combined output through a second number of layers of the convolutional neural network by means of one of the two or more circuitries for extracting features related to objects in the scene.

Thus, the processing of the image data through the first number of layers is divided on two or more different circuitries. Specifically, two or more different portions of the image data are processed through the first number of layers by means of different ones of the two or more circuitries. The two or more different portions are arranged such that the corresponding two or more portions of the scene they represent are partially overlapping. In other words, each portion of the image data of the two or more portions of the image data represents a portion of the scene which partially overlaps a portion of the scene represented by another one of the portions of the image data.

Processing the two or more portions of the image data through the first number of layers of the convolutional neural network on a respective one of the two or more circuitries, enables a portion of the processing to be made in parallel which reduces total processing time.

The two or more circuitries may be equal in number as the two or more portions of the image data. In such a case, the processing of the combined output through a second number of layers of the convolutional neural network will be by means of one of the two or more circuitry that processed one of the two or more portions of the image data through the first number of layers of the convolutional neural network.

The two or more circuitries may be larger in number than the two or more portions of the image data. In such a case, the processing of the combined output through a second number of layers of the convolutional neural network may be by means of one of the two or more circuitry that did not process any one of the two or more portions of the image data through the first number of layers of the convolutional neural network.

By having the two or more portions of the scene partially overlapping, the respective two or more portions of the image data will include image data representing partially overlapping portions of the scene. This enables processing the two or more portions of the image data the first number of layers of the convolutional neural network independently on a respective one of the two or more circuitries.

For a given first number of layers, the size by which the two or more portions of the scene are partially overlapping may be selected such that processing the first number of layers is encompassed. The size by which the two or more portions of the scene are partially overlapping may further be based on a filter (kernel) size and a stride of the convolution in each layer of the first number of layers of the convolutional neural network. Alternatively, for a given size by which the two or more portions of the scene are partially overlapping the first number of layers may be selected such that processing the first number of layers is encompassed. The first number of layers may further be based on a filter size and a stride of the convolution in each layer of the first number of layers of the convolutional neural network.

Furthermore, the first number of layers and the size by which the two or more portions of the scene are partially overlapping may be based on the filter size and the stride of each convolution of the first number of layers of the convolutional neural network.

The two or more circuitries may consist of a first circuitry and a second circuitry. The act of processing the two or more portions of the image data may then comprise processing, by means of the first circuitry, a first portion of the image data representing a first portion of the scene through the first number of layers of the convolutional neural network to form a first output, and processing, by means of the second circuitry, a second portion of the image data representing a second portion of the scene through the first number of layers of the convolutional neural network to form a second output, wherein the first and second portions of the scene are partially overlapping. The act of combining the two or more outputs then comprises combining the first and second outputs to form the combined output, and the act of processing the combined output comprises processing the combined output through the second number of layers of the convolutional neural network by means of one of the first and second circuitry for extracting features related to objects in the scene.

Thus, the processing of the image data through the first number of layers is divided on the first circuitry and the second circuitry. Specifically, the first portion of the image data and the second portion of the image data are processed through the first number of layers by means of the first circuitry and the second circuitry, respectively. The first portion of the image data and the second portion of the image data are arranged such that the corresponding first portion of the scene and the second portion of the scene they represent are partially overlapping. In other words, the first portion of the image data represents the first portion of the scene which partially overlaps the second portion of the scene represented by second portion of the image data.

The first portion of the image data may be image data captured by a first image sensor and the second portion of the image data may be image data captured by a second image sensor. In other words, the first image sensor captures the first portion of the scene and the second image sensor captures the second portion of the scene and the first and second portions of the scene are partially overlapping.

This is beneficial for example when two sensors capture image data representing two portions of a scene in order to form a panoramic image by combining the image data representing the two portions of the scene. The two portions of the scene are in such cases typically partially overlapping, and the overlap between the two portions of the scene is used, e.g. by means of blending of image data from both of the two sensors, to reduce the risk of joint lines or the like in areas of the panoramic image corresponding to the border in the scene between what is captured by the two sensors. Image data from the first image sensor and the second image sensor may be processed directly through the first number of layers by means of the first circuitry and the second circuitry, respectively, without first combining them to form one image, e.g. by blending of image data from both of the two sensors.

The two or more circuitries may consist of four circuitries. The act of processing the two or more portions of the image data may then comprise:

processing, by means of a first circuitry, a first portion of the image data representing a first portion of the scene through the first number of layers of the convolutional neural network to form a first output;

processing, by means of a second circuitry, a second portion of the image data representing a second portion of the scene through the first number of layers of the convolutional neural network to form a second output, wherein the first and second portions of the scene are partially overlapping, processing, by means of a third circuitry, a third portion of the image data representing a third portion of the scene through the first number of layers of the convolutional neural network to form a third output, wherein the second and third portions of the scene are partially overlapping; and processing, by means of a fourth circuitry, a fourth portion of the image data representing a fourth portion of the scene through the first number of layers of the convolutional neural network to form a fourth output, wherein the third and fourth portions of the scene are partially overlapping.

The act of combining the two or more outputs then comprises combining the first, second, third and fourth outputs from the processing of the first and second portions of the image data to form the combined output, and the act of processing the combined output comprises processing the combined output through the second number of layers of the convolutional neural network by means of one of the first, second, third and fourth circuitry for extracting features related to objects in the scene.

By using four circuitries to process the image data divided into four portions, the number of calculations for each circuitry is reduced in relation to using two circuitries to process the image data divided into two portions. However, as the four portions of the image data represents four portions of the scene which are partially overlapping, the number of calculations to process the four portions of the image data through using the four circuitries is not half of the number of calculations to process two portions of the image data using two circuitries.

In alternative, when the two or more circuitries consists of four circuitries, the act of processing the two or more portions of the image data may comprise:

processing, by means of a first circuitry, a first portion of the image data representing a first portion of the scene through the first number of layers of the convolutional neural network to form a first intermediate output;

processing, by means of a second circuitry, a second portion of the image data representing a second portion of the scene through the first number of layers of the convolutional neural network to form a second intermediate output, wherein the first and second portions of the scene are partially overlapping;

combining the first and second intermediate outputs from the processing of the first and second portions of the image data to form a first intermediate combined output;

processing, by means of a third circuitry, a third portion of the image data representing a third portion of the scene through the first number of layers of the convolutional neural network to form a third intermediate output, wherein the second and third portions of the scene are partially overlapping;

processing, by means of a fourth circuitry, a fourth portion of the image data representing a fourth portion of the scene through the first number of layers of the convolutional neural network to form a fourth intermediate output, wherein the third and fourth portions of the scene are partially overlapping;

combining the third and fourth intermediate outputs from the processing of the third and fourth portions of the image data to form a second intermediate combined output;

processing, by means of one of the first, second, third and fourth circuitries, the first intermediate combined output through a third number of layers of the convolutional neural network to form a first output; and processing, by means of a different one of the first, second, third and fourth circuitries, the second intermediate combined output through the third number of layers of the convolutional neural network to form a second output.

The act of combining the two or more outputs then comprises combining the first and second outputs to form the combined output, and the act of processing the combined output comprises processing the combined output through the second number of layers of the convolutional neural network by means of one of the first, second, third and fourth circuitry for extracting features related to objects in the scene.

For a given first number of layers, the size by which the first and second portions of the scene, second and third portions of the scene, and third and fourth portions of the scene are partially overlapping may be selected such that processing the first number of layers is encompassed. Additionally, for a given third number of layers, the size by which the second and third portions of the scene are partially overlapping may be selected such that, in addition to processing the first number of layers is encompassed, processing the third number of layers is also encompassed. The size by which the first and second portions of the scene, second and third portions of the scene, and third and fourth portions of the scene are partially overlapping may further be based on a filter size and a stride of each convolution in the first number of layers of the convolutional neural network and in the third number of layers of the convolutional neural network.

Alternatively, for a given size by which the first and second portions of the scene, second and third portions of the scene, and third and fourth portions of the scene are partially overlapping the first number of layers may be selected such that processing the first number of layers is encompassed and processing the third number of layers is encompassed. The first number of layers and the third number of layers may further be based on a filter size and a stride of each convolution of the first number of layers of the convolutional neural network and of the third number of layers of the convolutional neural network.

The first portion of the image data may be image data captured by a first image sensor, the second portion of the image may be image data captured by a second image sensor, the third portion of the image data may be image data captured by a third image sensor, and the fourth portion of the image data may be image data captured by a fourth image sensor, wherein the second and third portions of the scene are overlapping more than the first and second portions and more than the third and fourth portions.

This is beneficial for example when four sensors capture image data representing four portions of a scene in order to form a panoramic image by combining the image data representing the four portions of the scene. The four portions of the scene are in such cases typically partially overlapping, and the overlap between the four portions of the scene is used, e.g. by means of blending of image data from both of the two sensors, to reduce the risk of joint lines or the like in areas of the panoramic image corresponding to the border in the scene between what is captured by the four sensors. Image data from the first image sensor, the second image sensor, the third image sensor, and the fourth image sensor may be processed directly through the first number of layers by means of the first circuitry, the second circuitry, the third circuitry, and the fourth circuitry, respectively, without first combining them to form one image, e.g. by blending of image data from the four sensors.

The second and third portions of the scene overlapping more than the first and second portions and more than the third and fourth portions enables processing the first and second intermediate combined outputs through the third number of layers of the convolutional neural network.

The image data may be image data captured by one image sensor.

In alternative, the image data may be image data captured by at least two image sensors. Each portion of the image data may then be captured by a separate image sensor of the at least two image sensors, and the at least two image sensors may be arranged such that image data are captured by the respective image sensors that represent respective portions of the scene that are partially overlapping.

The image data may also be a combination, such that two or more portions of the image data are captured by the same image sensor and two or more portions of the image data are captured by separate image sensors.

The first number of layers and a size by which the two or more portions of the scene are partially overlapping may be selected such that processing the first number of layers is encompassed.

According to a second aspect, a non-transitory computer-readable storage medium is provided having stored thereon instructions for implementing the method according to the first aspect, when executed by a device having processing capabilities.

According to a third aspect, a device for processing image data representing a scene for extracting features related to objects in the scene using a convolutional neural network is provided. The device comprises two or more circuitries configured to execute a first processing function configured to process, by means of a respective one of the two or more circuitries, two or more portions of the image data representing a respective one of two or more portions of the scene through a first number of layers of the convolutional neural network to form two or more outputs, wherein the two or more portions of the scene are partially overlapping. The two or more circuitries are further configured to execute a combining function configured to combine the two or more outputs to form a combined output, and a second processing function configured to process the combined output through a second number of layers of the convolutional neural network by means of one of the two or more circuitries for extracting features related to objects in the scene.

The image data may be image data captured by one image sensor.

In alternative, the image data may be image data captured by at least two image sensors.

The device may comprise four or more circuitries. The first processing function is then further configured to process, by means of a respective one of the four or more circuitries, four portions of the image data captured by a respective one of four image sensors and representing a respective one of four portions of the scene through the first number of layers of the convolutional neural network to form four intermediate outputs, wherein the four portions of the scene are partially overlapping, and to combine two of the four intermediate outputs to a first intermediate combined output and the remaining two of the four intermediate outputs to a second intermediate combined output. The device is further configured to execute a third processing function configured to process, by means of two of the four or more circuitries, a respective one of the first intermediate combined output and the second intermediate combined output through a third number of layers of the convolutional neural network to form a first output and a second output, respectively.

The above-mentioned acts of the method according to the first aspect, when applicable, apply to the device of the third aspect as well.

According to a fourth aspect, a system for capturing and processing image data representing a scene for extracting features related to objects in the scene using a convolutional neural network is provided. The system comprises a device according to the third aspect where the device comprises four or more circuitries. The system further comprises a camera for capturing the image data representing the scene. The camera comprises a first image sensor arranged for capturing a first portion of the image data representing a first portion of the scene, a second image sensor arranged for capturing a second portion of the image data representing a second portion of the scene, a third image sensor arranged for capturing a third portion of the image data representing a third portion of the scene, a fourth image sensor arranged for capturing a fourth portion of the image data representing a fourth portion of the scene. The first, second, third and fourth image sensors are arranged such that the second and third portions of the scene are overlapping more than the first and second portions and more than the third and fourth portions.

The above-mentioned acts of the method according to the first aspect, when applicable, apply to the system of the fourth aspect as well.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein. Rather, these embodiments are provided for thoroughness and completeness, and to convey the scope of the invention to the skilled person.

Figure 1:
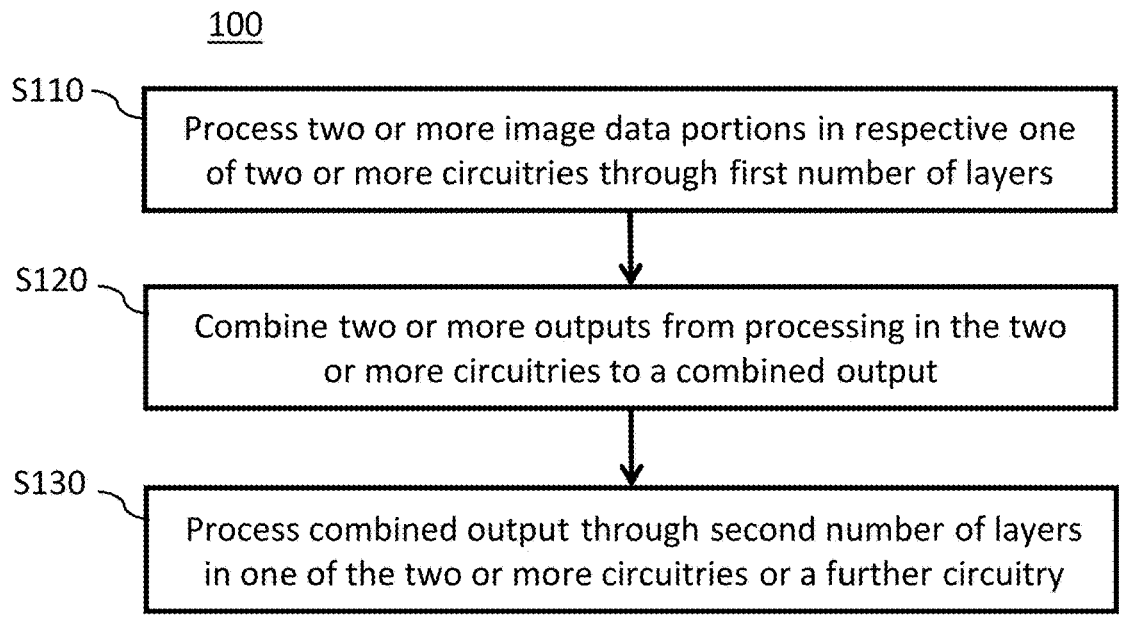
FIG. 1 is a flow chart of embodiments of a method of processing image data representing a scene for extracting features related to objects in the scene using a convolutional neural network.

FIG. 1 is a flow chart of embodiments of a method 100 of processing image data representing a scene for extracting features related to objects in the scene using a convolutional neural network. If, for example, the image data representing the scene relates to a high-resolution image or a panoramic image, a large amount of data needs to be processed through layers of the convolutional neural network and hence, the amount of calculations will become large. The image data may thus be divided into two or more portions representing a respective one of two or more portions of the scene which are processed S110 by means of a respective one of two or more circuitries through a first number of layers of the convolutional neural network to form two or more outputs. Hence, these two or more portions of the image data may be processed in parallel through the first number of layers of the convolutional neural network and thus the total time for processing will be reduced. A circuitry is an arrangement of a circuit or a system of circuits. It may for example be arranged on a chip, and may further comprise or be otherwise arranged together with software for performing the processing.

However, when the image data is divided into the two or more portions of image data representing the two or more portions of the scene, some objects in the scene will occur at a border between two portions of the scene of the two or more portions of the scene and hence be represented in image data at a border between two portions of image data of the two or more portions of the image data. Hence, due to inherent properties of convolutional neural networks, each of the two or more portions of the image data need to include image data representing an overlapping part of each of neighbouring portions of the scene of the two or more portions of the scene, to be able to identify also features related to objects in the scene occurring at the border between two portions of the scene of the two or more portions of the scene. Hence, the two or more portions of the scene are arranged such that they partially overlap. The size by which the two or more portions of the scene are partially overlapping and the first number of layers of the convolutional neural network are interdependent. The larger the size of the overlap, the larger the first number of layers may be and the larger the first number of layers to be processed, the larger the size of the overlap needs to be. Hence, if processing through a given first number of layers should be possible, the size by which the two or more portions of the scene are partially overlapping needs to be selected large enough to encompass such processing. The size by which the two or more portions of the scene are partially overlapping is typically determined to result in a required number of pixels the two or more portions of the image data need to partially overlap in order to encompass processing through the first number of layers of the convolutional neural network. Properties of the first layers of the convolutional neural network affecting the size by which the two or more portions of the scene need to be partially overlapping, are a filter size and a stride of the convolution in each layer of the first number of layers of the convolutional neural network. Conversely, for a given size by which the two or more portions of the scene are partially overlapping, the filter size and a stride of the convolution in each layer of the convolutional neural network will govern the first number of layers that may be processed.

Figure 5:
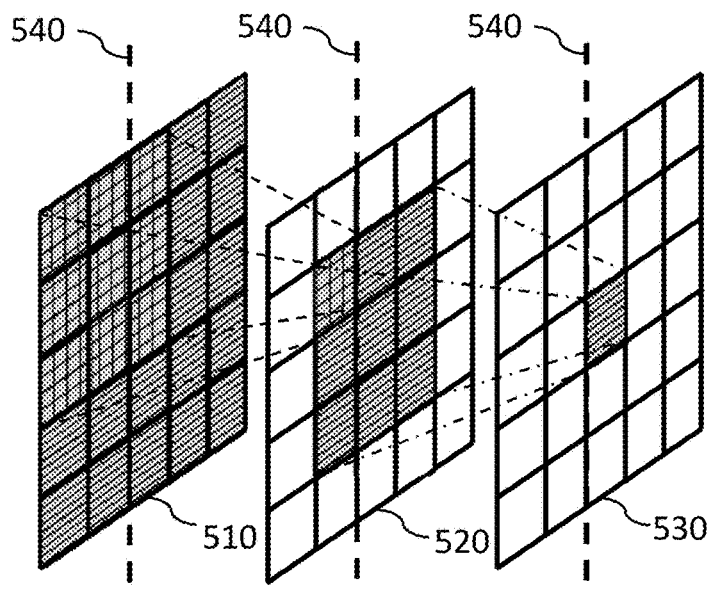
FIG. 5 is a schematic view of a number of pixels of an image in relation to processing of layers of a convolutional neural network.

The partial overlap between the portions of the scene will correspond to an overlap of pixels between the portions of the image data. The overlapping pixels between two portions of the image data may be identical pixels if a single image sensor has been used for the two portions of the image data. In alternative, the overlapping pixels may be captured from two different image sensors such that the overlapping pixels are not identical for the two portions of the image data but represent the same part of the scene. For illustration of how the filter size of the convolution in a layer affects the number of pixels overlap needed to process layers of a convolutional neural network, reference is made to FIG. 5, which is a schematic view of a first layer 510, a second layer 520, and a third layer 530, each relating to a subset of 5×5 pixels of an image in relation to processing of layers of a convolutional neural network. A convolution in each of the second layer 520 and the third layer 530 is 3×3. This means that features in these layers have a data locality of 3×3 pixels. To create one "pixel" in a layer, 3×3 pixels are needed in the preceding layer. In FIG. 5 this is illustrated by a pixel in the second layer 520 illustrated with a grid pattern requiring 3×3 pixels in the first layer 510 illustrated with the grid pattern. Similarly, a pixel in the third layer 530 illustrated with a striped pattern requires 3×3 pixels in the second layer 520 with the striped pattern and the grid pattern. Also, as illustrated in FIG. 5, the pixel in the third layer 530 illustrated with the striped pattern requires 5×5 pixels in the first layer 510 illustrated with the striped pattern and the grid pattern. Hence, if an image is to be divided into two or more portions and a border between two neighbouring portions of the two or more portions is vertical in the image corresponding to a vertical line 540 between the second and third column of pixels in the first layer 510, the second layer 520 and the third layer 530, one additional column of pixels has to be processed for each of the two neighbouring portions through the second layer 520 in order to create pixels of the third layer 530 at the border corresponding to the vertical line 540. Furthermore, two additional columns of pixels have to be processed for each of the two neighbouring portions through the second layer 520 in order to create pixels of the third layer 530 at the border corresponding to the vertical line 540. The number of additional columns of pixels required in the first layer 510 is based on the filter size of the convolution in the second layer 520 and the third layer 530. In this case the number of additional columns is $(3-1)/2+(3-1)/2$. For a N×N convolution in a layer, the number of additional columns required from a previous layer would be $(N-1)/2$ in order to create pixels at the border in the layer. Furthermore, a stride of a layer, i.e. the number of pixels the N×N filter moves in the layer when creating pixels for a next layer, also affects the number of additional columns required in the layer in order to create pixels at the border in the next layer. In FIG. 5, the stride is 1 for both the first layer 510 and the second layer 520. If the stride is 2 in a layer with N×N convolution, the number of additional columns required in relation to that layer in order to create pixels at the border in a next layer would be $((N-1)/2)\times 2$.

It is to be noted that the overlap needed into a neighbouring portion of the image data in order to process a portion of the image data through the first number of layers of the convolutional neural network is also needed into that portion of the image data to process the neighbouring portion of the image data through the first number of layers of the convolutional neural network. Hence, the additional pixels between two neighbouring portions of the two or more portions of the image data is two times the additional pixels for one portion. Furthermore, the greater number of portions of the image data there are, the greater number of borders between portions there are and hence, the greater number of additional pixels are required. However, the number of additional pixels required depends on the length of the border. Hence, the division should preferably be made such that the border is as short as possible. An image that is wider than it is high, e.g. a panoramic image, for example, is preferably divided by the width with vertical borders between the portions.

Dividing the processing of the image data through the first number of layers of the convolutional neural network into separate processing of the two or more portions of the image data through the first number of layers of the convolutional neural network on a respective one of the two or more circuitries, enables a portion of the processing to be made in parallel which reduces total processing time. Generally, the more portions the image data are divided into and processed through the first number of layers of the convolutional neural network on respective separate circuitries, the more the total processing time is reduced. However, as the size by which the portions need to overlap depends on properties of the first number of layers of the convolutional neural network, the size will be the same regardless of the number of portions the image data are divided into. Hence, the portion of the image data that will be processed on two different circuitries will increase with the number of portions the image data are divided into and thus the reduction of processing time will be less significant the greater number of portions the image data are divided into.

As the amount of image data that need to be processed through the first number of layers of the convolutional neural network by two different circuitries is determined by the size (width) of the overlap and the length of the overlap, and the size (width) of the overlap required is given by the first number of layers, the division of the image data into the two or more portions of image data is preferably made such that the overlap is as short as possible. For an image that is wider than it is high, e.g. a panoramic image, the division is preferably made vertically, such that the two or more portions of the image data represent a respective one of two or more vertical portions of the scene where the vertical portions overlap at the vertical border between adjacent vertical portions.

When one image representing the scene is to be processed through the first number of layers, the partial overlap between the two or more portions of the scene corresponds to the partial overlap between two or more portions of image data of the image. The size of the partial overlap required between the two or more portions of the image data representing the two or more portions of the scene depends on the number of layers together with the filter size and stride of each layer. Hence, given the filter size and stride of each layer, the size of the partial overlap required will depend on the number of layers. Hence, if the overlap is made large, the number of layers that can be processed in parallel, i.e. the first number of layers, can be made large. On the other hand, a large overlap between the two or more portions of the image data will result in processing a larger amount of the same image data by the two circuitries. Instead of processing the two or more portions of the image data through all of the first number of layers separately on the two or more circuitries, an alternative approach can be used. In the alternative approach, two or more portions of the image data with a reduced partial overlap are processed through a subset of the first number of layers on a respective one of the two or more circuitries. After this, data resulting from the processing on each of the two or more circuitries, which data are needed for processing through a subsequent subset of the first number of layers on other ones of the two or more circuitries, are provided to the other ones of the two or more circuitries, i.e. copying necessary overlap image data between circuitries. This is repeated until processing has been done through all of the first number of layers. In this approach duplicated processing is reduced since the initial overlap can be made smaller than would have been required for processing the two or more portions of the image data through all of the first number of layers separately on the two or more circuitries. However, the smaller the initial overlap, the larger number of subsets of the first number of layers need to be processed with intermediate exchange of data between the two or more circuitries.

The two or more portions of the image data may relate to image data of one image of the scene. The image may have been captured by one image sensor or produced by combining images captured by more than one image sensor. In that case, the image data may be divided into two or more portions, where each of the two or more portions of the image data partially overlaps neighbouring portions of the image data, i.e. include a portion of the same image data as the neighbouring portions of image data corresponding to the overlap. This overlap then corresponds to the overlap between the two or more portions of the scene which the two or more portions of the image data represent.

In alternative, the two or more portions of the image data may relate to image data from a respective one of two or more images captured by two or more image sensors wherein the two or more image sensors captures a respective one of the two or more portions of the scene and wherein the two or more portions of the scene are partially overlapping. In such a case the two or more portions of the image data will not include a portion of the same image data as the neighbouring portions of image data corresponding to the overlap since the image data for the overlap is captured by different image sensors for different portions of the image data. However, if the image sensors are calibrated the portion of the image data corresponding to the overlap will be similar except for noise. By using the image data directly from the two or more image sensors for processing through the first number of layers, there is no need for exchanging image data captured by the two or more image sensors between the two or more circuitries before processing through the first number of layers.

Furthermore, a combination is also feasible. In such a case, at least two of the two or more portions of the image data relate to image data captured by a respective one of at least two image sensors, and at least two of the two or more portions of the image data relate to image data captured by one image sensor. For example, for three portions of the image data, one of the portions may relate to one image sensor and two of the portions may relate to a different image sensor.

When the two or more portions of the image data have been processed S130 through the respective one of the two or more circuitries through the first number of layers of the convolutional neural network to form two or more outputs, the two or more outputs are combined S120 to form a combined output. The combination of the two or more outputs may be made by stitching the two outputs together and cropping data relating to the overlap. The combined output is then processed S130 through a second number of layers of the convolutional neural network by means of one of the two or more circuitries for extracting features related to objects in the scene. Using one of the two or more circuitries used to process one of the two or more portions of the image data through the first number of layers of the convolutional neural network, also to process the combined output through the second number of layers of the convolutional neural network means that the total number of circuitries needed is the same as the number of portions of the image data. One of the two or more circuitries will then be busy during the time when the processing of the combined output through the second number of layers of the convolutional neural network whilst the other circuitries of the two or more circuitries are not. During that time new processing of a respective one of two or more portions of image data relating to one or more further images, such as one or more next image frames of a video stream, may be started by the circuitries of the two or more circuitries that are not processing the combined output. The circuitry of the two or more circuitries used to process the combined output through the second number of layers of the convolutional neural network may be alternated between different image frames, such as between different image frames of a video stream in order to achieve load balancing between the two or more circuitries. If instead the total number of circuitries is larger than the number of portions of the image data, a circuitry other than the circuitries of the two or more circuitries used to process a respective one of the two or more portions of the image data through the first number of layers of the convolutional neural network may be used to process the combined output through the second number of layers of the convolutional neural network. In that case, the circuitries other than the circuitry used to process the combined output through the second number of layers of the convolutional neural network may be used directly to start processing of two or more portions of image data relating to another image, such as a next image frame of a video stream. This will reduce the need for load balancing between the two or more circuitries but on the other hand at least one further circuitry is required.

Figure 2:
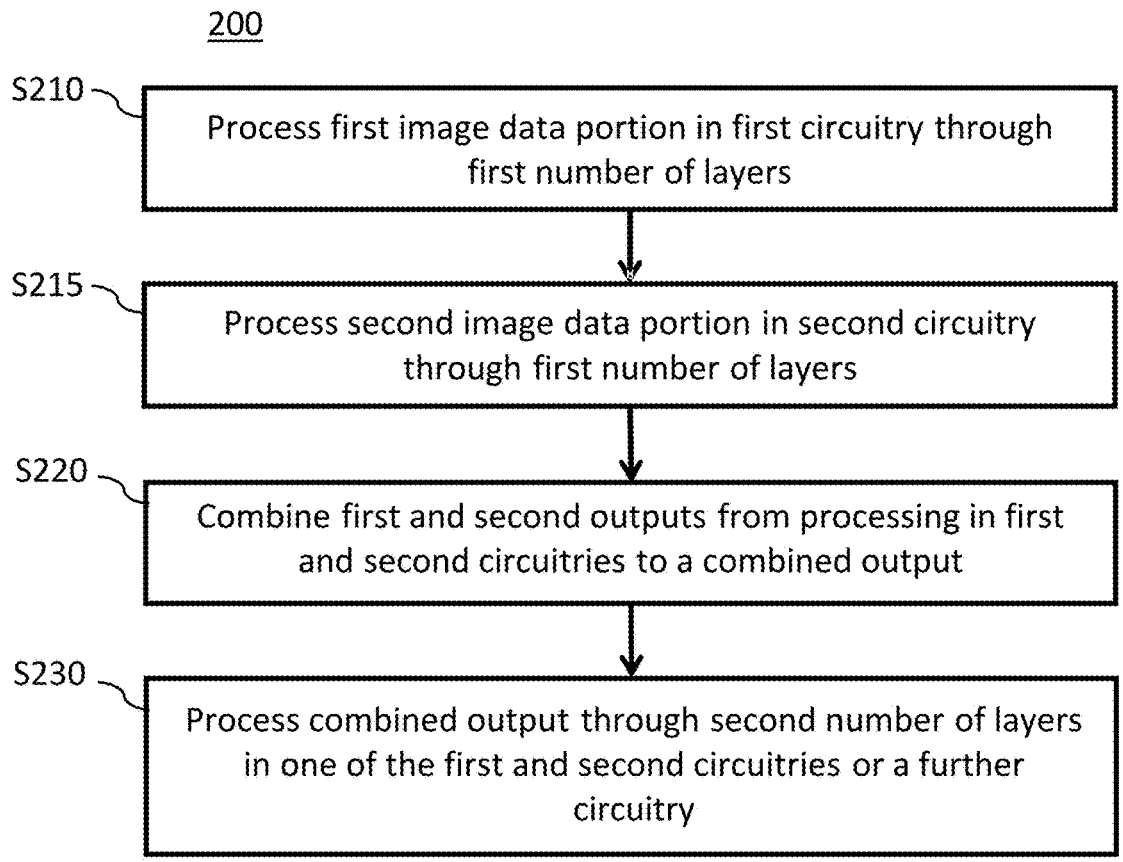
FIG. 2 is a flow chart of further embodiments of a method of processing image data representing a scene for extracting features related to objects in the scene using a convolutional neural network.

FIG. 2 is a flow chart of further embodiments of a method 200 of processing image data representing a scene for extracting features related to objects in the scene using a convolutional neural network. Specifically, FIG. 2 relates to embodiments where there are two portions of the image data and where processing is done on a respective one of two circuitries. A first portion of the image data representing a first portion of the scene is processed S210, by means of the first circuitry, through the first number of layers of the convolutional neural network to form a first output. A second portion of the image data representing a second portion of the scene is processed S215, by means of the second circuitry, through the first number of layers of the convolutional neural network to form a second output. The first and second portions of the scene are partially overlapping. The first and second outputs are then combined S220 to form a combined output. The combination of the two or more outputs may be made by stitching the two outputs together and cropping data relating to the overlap. The combined output is processed S230 through the second number of layers of the convolutional neural network by means of one of the first circuitry and the second circuitry for extracting features related to objects in the scene. The combined output may in alternative be processed S230 through the second number of layers of the convolutional neural network by means of a further circuitry other than the first circuitry and the second circuitry.

For example, if image frames of a video stream are to be processed by the first circuitry and the second circuitry through the first and second number of layers of the convolutional neural network, the first circuitry may process a first portion of image data relating to a first image frame through the first number of layers and the second circuitry may process a second portion of the image data relating to the first image frame through the first number of layers. The first circuitry may then be used to process the combined output through the second number of layers. Once the first circuitry is finished with processing the combined output relating to the first frame through the second number of layers, it may start processing a first portion of image data relating to a second image frame through the first number of layers. In parallel to the processing by means of the first circuitry of the combined output through the second number of layers and the first portion of the image data relating to the second image frame through the first portion of image data, the second circuitry may be used to process a second portion of the image data relating to the second image frame through the first number of layers, and depending on the processing time for the first circuitry to process the combined output through the second number of layers and processing the first portion of the image data relating to the second image frame, the second circuitry may continue to be used in parallel to process a first portion of image data relating to a third image frame etc. Once the first circuitry is finished with processing the combined output relating to the first image frame through the second number of layers and processing the first portion of the image data relating to the second image frame, the second circuitry may start processing the combined output relating to the second image frame through the second number of layers. Once the second circuitry is finished with processing the combined output relating to the second frame through the second number of layers, it may start processing a second portion of the image data relating to the third image frame through the first number of layers. The circuitry of the first circuitry and the second circuitry may then be alternated between image frames in order to achieve load balancing.

The size of the first portion and the second portion of the image data relating to each image frame may also differ. For example, the first portion of the image data relating to the first frame may be smaller than the second portion of the image data relating to the first frame, e.g. half the size, when the first circuitry that processes the first portion through the first number of layers also processes the combined output relating to the first image frame through the second number of layers. The first portion of the image data relating to the second frame may then be larger than the second portion of the image data relating to the second frame, e.g. twice the size, when the second circuitry that processes the second portion through the first number of layers also processes the combined output relating to the second image frame through the second number of layers. This may reduce the number of image frames that are required to be processed in parallel.

If instead there is one or more further circuitries in addition to the first circuitry and the second circuitry, one of the one or more further circuitries can be used to process the combined output through the second number of layers of the convolutional neural network. In that case, the first circuitry and the second circuitry may be used directly for processing of the first portion of image data relating to the second image frame, and a second portion image data relating to the second image frame, respectively. This will reduce the need for load balancing between the two or more circuitries over image frames but on the other hand at least one or more further circuitries are required. The number of the one or more further circuitries may be selected depending on the processing time for processing a portion of image data through the first number of layers and processing time for processing the combined output through the second number of layers. If, for example, the processing time for the first number of layers is half the processing time for the second number of layers, using two further circuitries for alternating the processing of combined output through the second number of layers will balance load in relation to the first circuitry and second circuitry.

The first portion of the image data and the second portion of the image data may relate to image data of one image of the scene. The image may have been captured by one image sensor or produced by combining images captured by more than one image sensor. In that case, some of the image data of the first portion of the image data will be identical to some of the image data of the second portion of the image data, namely the image data representing the partial overlap between the first portion of the scene and the second portion of the scene.

Alternatively, the first portion of the image data may be image data captured by a first image sensor and the second portion of the image data may be image data captured by a second image sensor. In other words, the first image sensor captures the first portion of the scene and the second image sensor captures the second portion of the scene and the first portion of the scene and the second portion of the scene are partially overlapping. In such a case the first portion of the image data and the second portion of the image data will not include some identical data as the image data representing the partial overlap between the first portion of the scene and the second portion of the scene since the image data representing this overlap is captured by different sensors for the first portion of the image data and the second portion of the image data. However, if the first image sensor and the second image sensor are calibrated, the image data corresponding to the overlap will be similar for the first portion of the image data and the second portion of the image data except for noise. Image data from the first image sensor and the second image sensor may be used as the first portion of the image data and the second portion of the image data, respectively, and processed directly through the first number of layers by means of the first circuitry and the second circuitry, respectively, without first combining them to form one image. By using the image data directly from the first image sensor and second image sensor as the first portion of time image data and the second portion of the image data, respectively, there is no need for exchanging image data captured by the first image sensor and the second image sensor between the first circuitry and the second circuitry before processing through the first number of layers.

For example, if an original image representing a scene has the size (resolution) 8192×2048 pixels, and an image representing the scene of the size (resolution) 2048×512 pixels should be processed through the layers of a convolutional neural network, such as mobilenet-ssd, the original image first has to be downscaled with a factor 4. Furthermore, if two portions of image data of the image to be processed should be processed through a first number of layers and the first number of layers are 48, each of the two portions of image data need to overlap with 148 pixels (592 pixels in relation to the resolution of the original image) into the other portion. Hence, for a division into two same size portions by the width of the image, the total size including the overlap of each portion of the image data then has to be 1172×512 pixels. Due to the overlap, the processing through the 48 layers of the two portions of image data on a respective one of two circuitries requires more calculations than would have been required if the complete image would have been processed through the 48 layers on one circuitry. However, since the processing can be made in parallel on the two circuitries, there will still be a reduction of total time.

Figure 3:
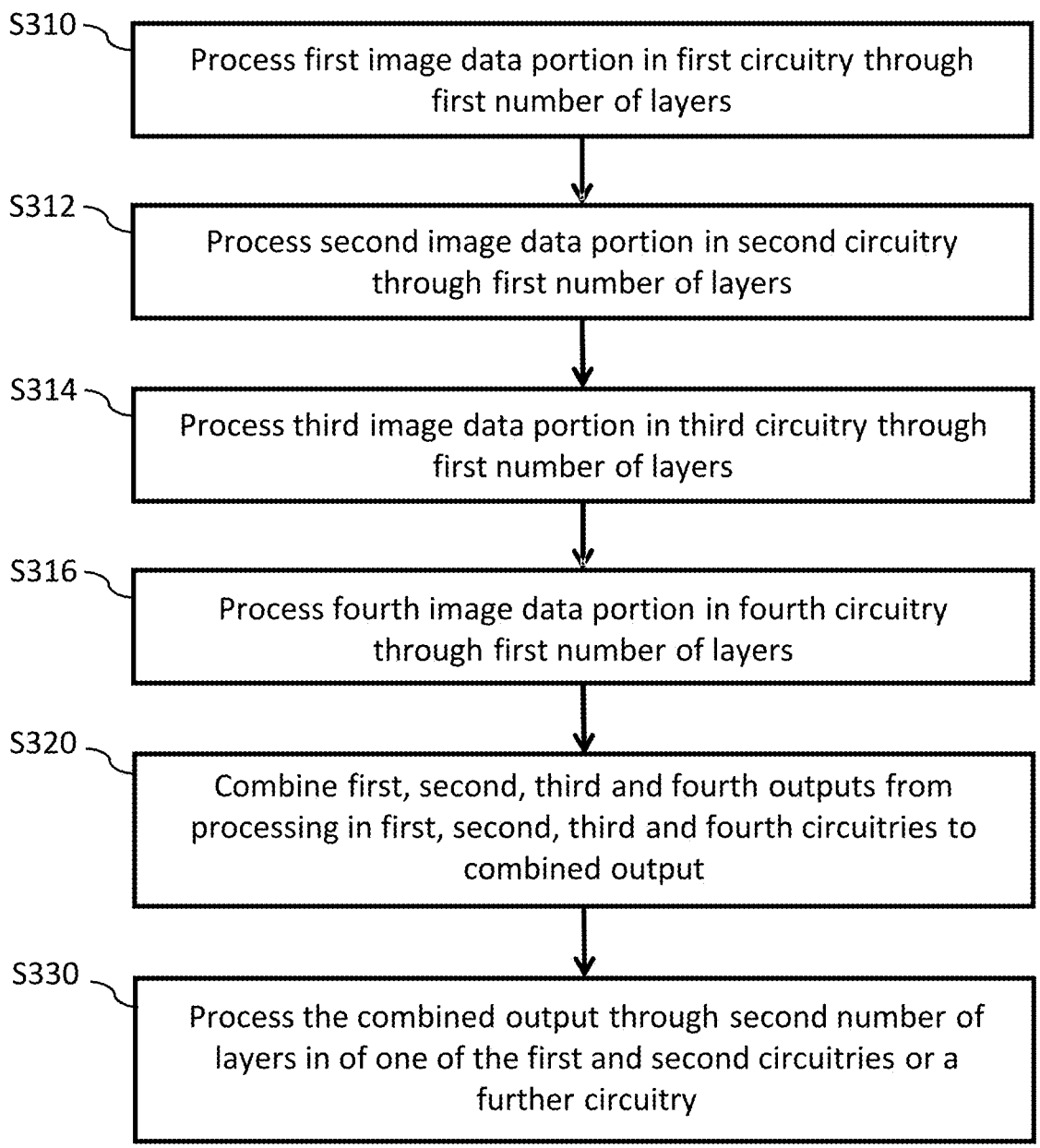
FIG. 3 is a flow chart of yet further embodiments of a method of processing image data representing a scene for extracting features related to objects in the scene using a convolutional neural network.

FIG. 3 is a flow chart of yet further embodiments of a method 300 of processing image data representing a scene for extracting features related to objects in the scene using a convolutional neural network. Specifically, FIG. 3 relates to embodiments where there are four portions of the image data and where processing is done on a respective one of four circuitries. A first portion of the image data representing a first portion of the scene is processed S310, by means of a first circuitry, through the first number of layers of the convolutional neural network to form a first output. A second portion of the image data representing a second portion of the scene is processed S312, by means of a second circuitry, through the first number of layers of the convolutional neural network to form a second output, wherein the first and second portions of the scene are partially overlapping. A third portion of the image data representing a third portion of the scene is processed S314, by means of a third circuitry, through the first number of layers of the convolutional neural network to form a third output, wherein the second and third portions of the scene are partially overlapping. A fourth portion of the image data representing a fourth portion of the scene is processed S316, by means of a fourth circuitry, through the first number of layers of the convolutional neural network to form a fourth output, wherein the third and fourth portions of the scene are partially overlapping. The first, second, third and fourth outputs from the processing of the first and second portions of the image data are combined S320 to form a combined output. The combined output is processed S330 through a second number of layers of the convolutional neural network by means of one of the first, second, third and fourth circuitry for extracting features related to objects in the scene.

By using four circuitries to process the image data divided into four portions, the number of calculations for each circuitry is reduced in relation to using two circuitries to process the image data divided into two portions. However, as the four portions of the image data represent four portions of the scene which are partially overlapping, the number of calculations to process the four portions of the image data through using the four circuitries is not half of the number of calculations to process two portions of the image data using two circuitries.

The first, second, third and fourth portions of the image data may relate to image data of one image of the scene. The image may have been captured by one image sensor or produced by combining images captured by more than one image sensor into one image analogously to what is described in relation to two portions of the image data in relation to FIG. 2.

Alternatively, the first, second, third, and fourth portions of the image data may be image data captured by a respective one of first, second, third and fourth image sensors as described analogously to what is described in relation to two portions of the image data in relation to FIG. 2. In this alternative, the image data captured by the respective one of the first, second, third, and fourth image sensors need not be combined to one image first and then divided into portions of the image data but may be used directly as a respective one of the first, second, third and fourth portions of the image data. Hence, there is no need for exchanging image data captured the first, second, third, and fourth image sensors between the first, second, third, and fourth circuitries before processing through the first number of layers.

Figure 4A:
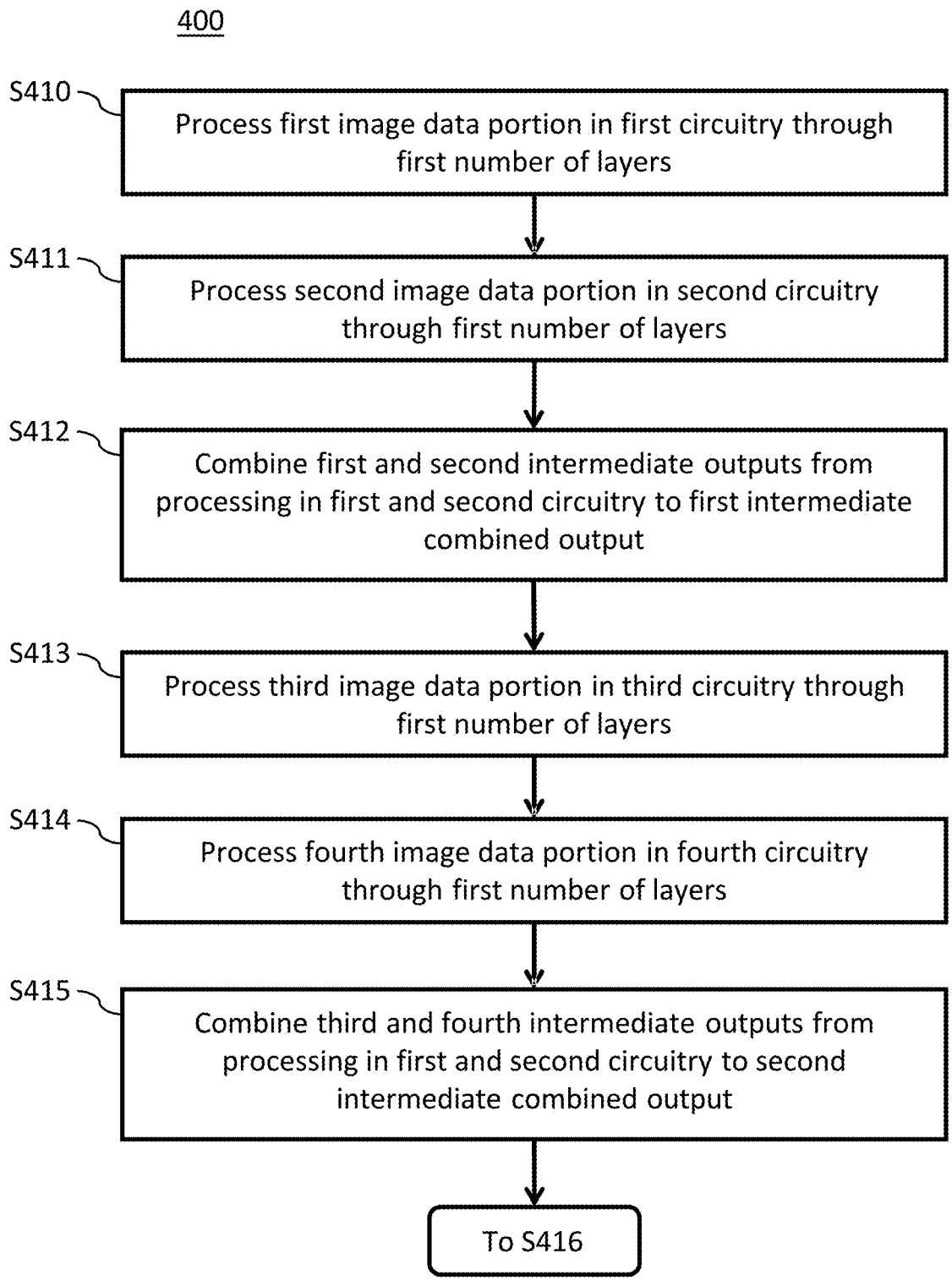
FIGS. 4a and 4b is a flow chart of yet further embodiments of a method of processing image data representing a scene for extracting features related to objects in the scene using a convolutional neural network.
Figure 4B:
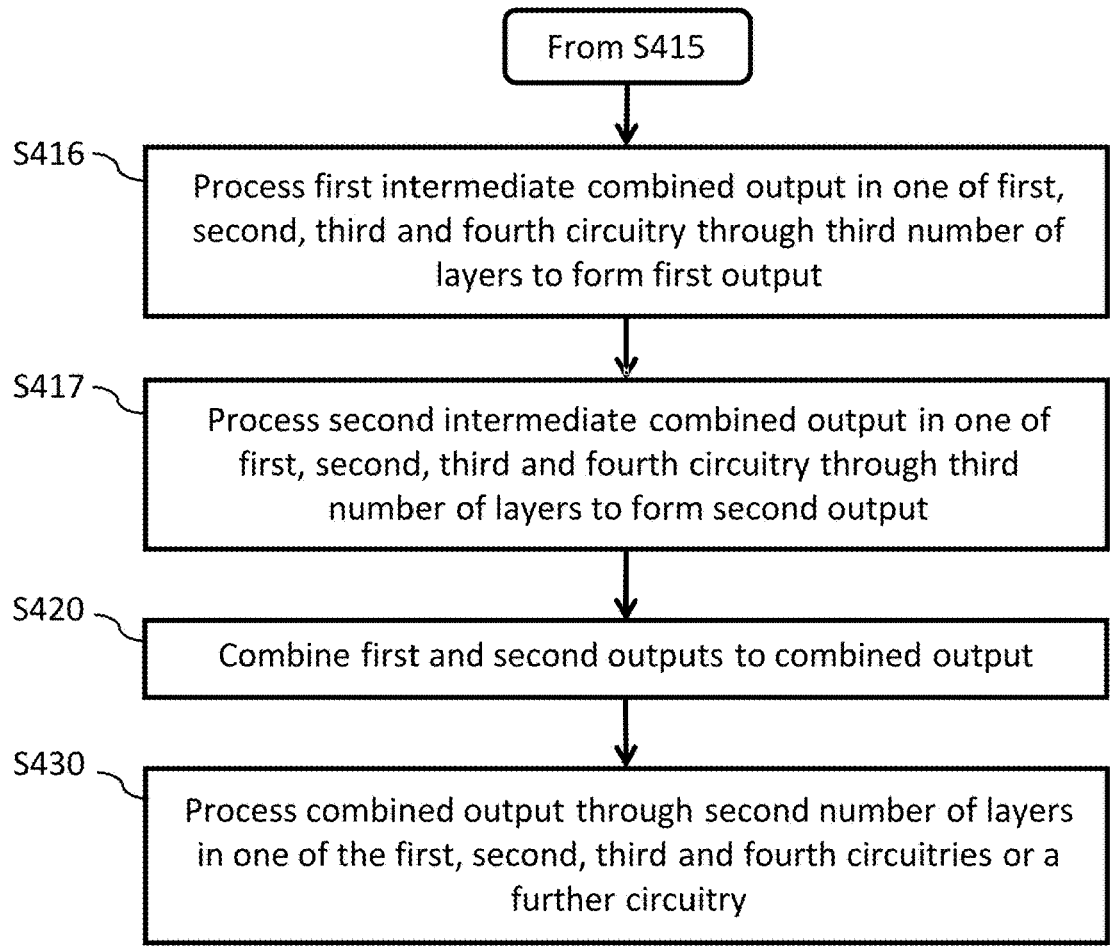

FIGS. 4a and 4b is a flow chart of yet further embodiments of a method 400 of processing image data representing a scene for extracting features related to objects in the scene using a convolutional neural network. Specifically, FIGS. 4a and 4b relate to embodiments where there are four portions of the image data and where processing is done first by means of a respective one of four circuitries and then on a respective one of two of the four circuitries. A first portion of the image data representing a first portion of the scene is processed S410, by means of a first circuitry, through the first number of layers of the convolutional neural network to form a first intermediate output. A second portion of the image data representing a second portion of the scene is processed S411, by means of a second circuitry, through the first number of layers of the convolutional neural network to form a second intermediate output, wherein the first and second portions of the scene are partially overlapping. The first and second intermediate outputs from the processing of the first and second portions of the image data are combined S412 to form a first intermediate combined output. A third portion of the image data representing a third portion of the scene is processed S413, by means of a third circuitry, through the first number of layers of the convolutional neural network to form a third intermediate output, wherein the second and third portions of the scene are partially overlapping. A fourth portion of the image data representing a fourth portion of the scene is processed S413, by means of a fourth circuitry, through the first number of layers of the convolutional neural network to form a fourth intermediate output, wherein the third and fourth portions of the scene are partially overlapping. The third and fourth intermediate outputs from the processing of the third and fourth portions of the image data are combined S415 to form a second intermediate combined output. The first intermediate combined output is processed S416, by means of one of the first, second, third and fourth circuitries, through a third number of layers (referred to as "intermediate number of layers" in relation to FIGS. 4a and 4b) of the convolutional neural network to form a first output. The second intermediate combined output is processed S417, by means of a different one of the first, second, third and fourth circuitries, through the intermediate number of layers of the convolutional neural network to form a second output. The first and second outputs are combined S420 to form the combined output. The combined output is processed S430 through the second number of layers (referred to as "last number of layers" in relation to FIGS. 4a and 4b) of the convolutional neural network by means of one of the first, second, third and fourth circuitry for extracting features related to objects in the scene.

For a given first number of layers and intermediate number of layers of the convolutional neural network, the first and second portions of the scene, and third and fourth portions of the scene need to be partially overlapping by a size such that processing the first number of layers is encompassed, and the second and third portions of the scene need to be partially overlapping by a size such that, processing the first number of layers and processing the intermediate number of layers are encompassed. Specifically, the size by which the first and second portions of the scene, and third and fourth portions of the scene need to be partially overlapping is based on a filter size and a stride of each convolution in the first number of layers of the convolutional neural network. The size by which the second and third portions of the scene need to be partially overlapping is based on the filter size and the stride of each convolution in the first number of layers of the convolutional neural network and a filter size and a stride of each convolution in the intermediate number of layers of the convolutional neural network.

Alternatively, for a given size by which the first and second portions of the scene, second and third portions of the scene, and third and fourth portions of the scene are partially overlapping, processing of a first number of layers is encompassed and processing of an intermediate number of layers is encompassed. Specifically, the first number of layers and the intermediate number of layers encompassed are based on a filter size and a stride of each convolution of the first number of layers of the convolutional neural network and of the intermediate number of layers of the convolutional neural network.

The first, second, third and fourth portions of the image data may relate to image data of one image of the scene. The image may have been captured by one image sensor or produced by combining images captured by more than one image sensor into one image analogously to what is described in relation to two portions of the image data in relation to FIG. 2.

Alternatively, the first, second, third, and fourth portions of the image data may be image data captured by a respective one of first, second, third and fourth image sensors as described analogously to what is described in relation to two portions of the image data in relation to FIG. 2. In this alternative, the image data captured by the respective one of the first, second, third, and fourth image sensors need not be combined to one image first and then divided into portions of the image data but may be used directly as a respective one of the first, second, third and fourth portions of the image data. Hence, there is no need for exchanging image data captured the first, second, third, and fourth image sensors between the first, second, third, and fourth circuitries before processing through the first number of layers. Additionally, since the two combined intermediate outputs are processed by means of respective ones of the four circuitries through the intermediate number of layers of the convolutional neural network, the second and third portions of the scene are overlapping more than the first and second portions and more than the third and fourth portions.

Figure 6:
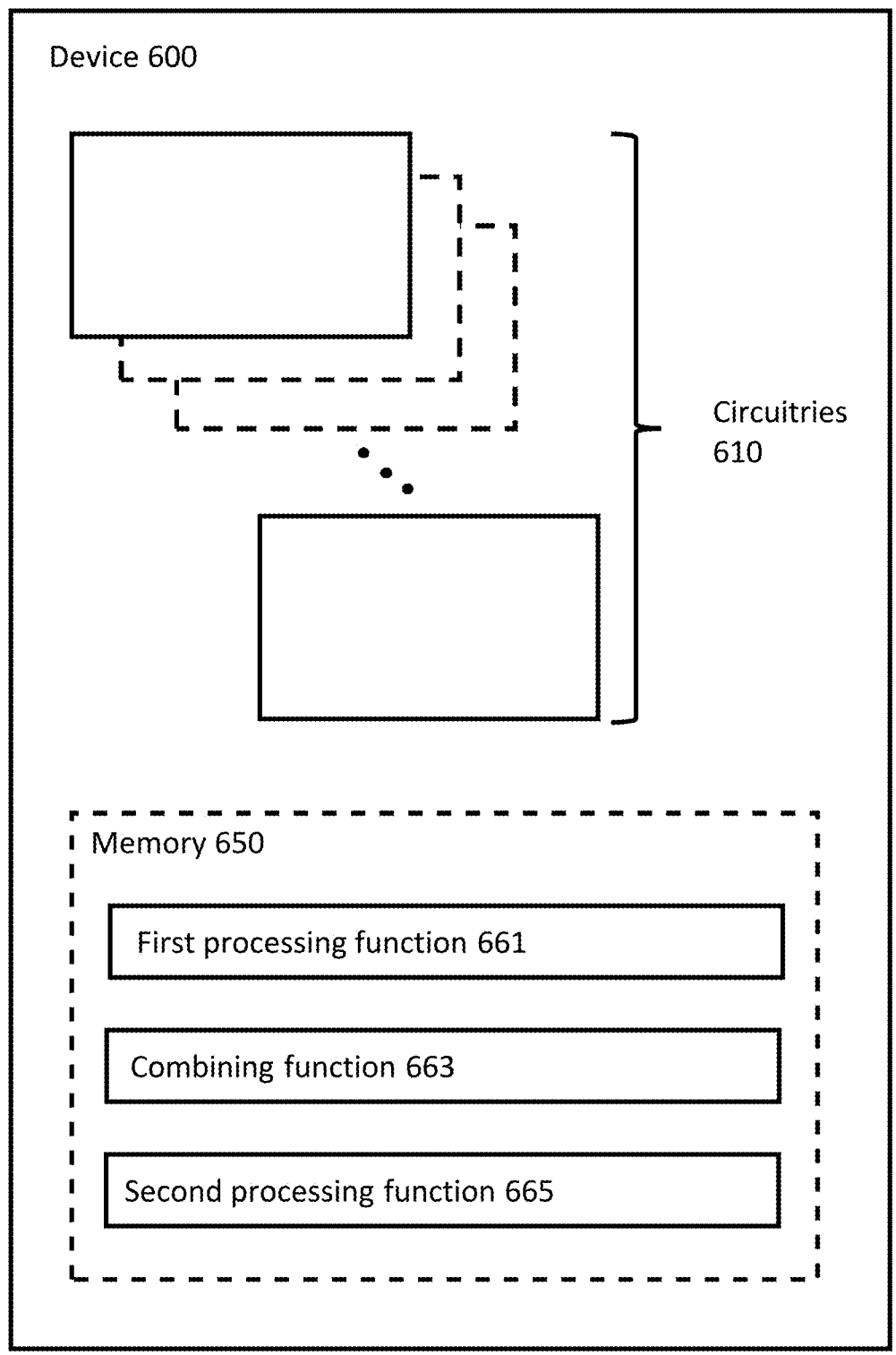
FIG. 6 is a schematic block diagram of embodiments of a device for processing image data representing a scene for extracting features related to objects in the scene using a convolutional neural network.

FIG. 6 is a schematic block diagram of embodiments of a device 500 for processing image data representing a scene for extracting features related to objects in the scene using a convolutional neural network. The device 600 comprises two or more circuitries 610 configured to execute a first processing function 661 configured to process, by means of a respective one of the two or more circuitries 610, two or more portions of the image data representing a respective one of two or more portions of the scene through a first number of layers of the convolutional neural network to form two or more outputs, wherein the two or more portions of the scene are partially overlapping. The two or more circuitries 610 are further configured to execute a combining function 663 configured to combine the two or more outputs to form a combined output, and a second processing function 665 configured to process the combined output through a second number of layers of the convolutional neural network by means of one of the two or more circuitries 610 for extracting features related to objects in the scene. The one circuitry of the two or more circuitries 610 by means of which the combined output is processed through the second number of layers of the convolutional neural network may be a circuitry of the two or more circuitries by means of which one of the two or more portions of the image data representing is processed through a first number of layers of the convolutional neural network or it may not. In the former case, the number of circuitries need only be as many as the number of portions of the image data that should be processed through the first number of layers of the convolutional neural network since the second number of layers of the neural network is processed by means of one of the circuitries used for processing the first number of layers. In the latter case, one more circuitry than the number of portions of the image data that should be processed through the first number of layers is needed since the second number of layers should be processed by a circuitry that did not process one of the portions of the image data through the first number of layers.

The image data may be image data captured by one image sensor. In alternative, the image data may be image data captured by at least two image sensors.

The two or more circuitries 610 are configured to carry out functions of the device 600. The two or more circuitries 610 may each include a processor (not shown), such as a central processing unit (CPU), microcontroller, or microprocessor. The processors are configured to execute program code such as program code configured to carry out the functions of the device 600.

The device 600 may further comprise a memory 650. The memory 650 may be one or more of a buffer, a flash memory, a hard drive, a removable media, a volatile memory, a non-volatile memory, a random access memory (RAM), or another suitable device. In a typical arrangement, the memory 650 may include a non-volatile memory for long term data storage and a volatile memory that functions as system memory for the two or more circuitries 610. The memory 650 may exchange data with the two or more circuitries 610 over a data bus. Accompanying control lines and an address bus between the memory 650 and the two or more circuitries 610 also may be present.

The functions of the device 600 may be embodied in the form of executable logic routines (e.g., lines of code, software programs, etc.) that are stored on a non-transitory computer readable medium (e.g., the memory 650) of the device 600 and are executed by the two or more circuitries 610 (e.g., using processors). Furthermore, the functions of the device 600 may be a stand-alone software application or form a part of a software application that carries out additional tasks related to the device 600. The described functions may be considered a method that processing units, e.g. processors of the two or more circuitries 610, are configured to carry out. Also, while the described functions may be implemented in software, such functionality may as well be carried out via dedicated hardware or firmware, or some combination of hardware, firmware and/or software.

The functions carried out by the device 600 and the circuitries 610 may be further adapted as corresponding steps of the method 100 described in relation to FIG. 1, of the method 200 described in relation to FIG. 2, of the method 300 described in relation to FIG. 3, and of the method 400 described in relation to FIGS. 4a and 4b.

Figure 7:
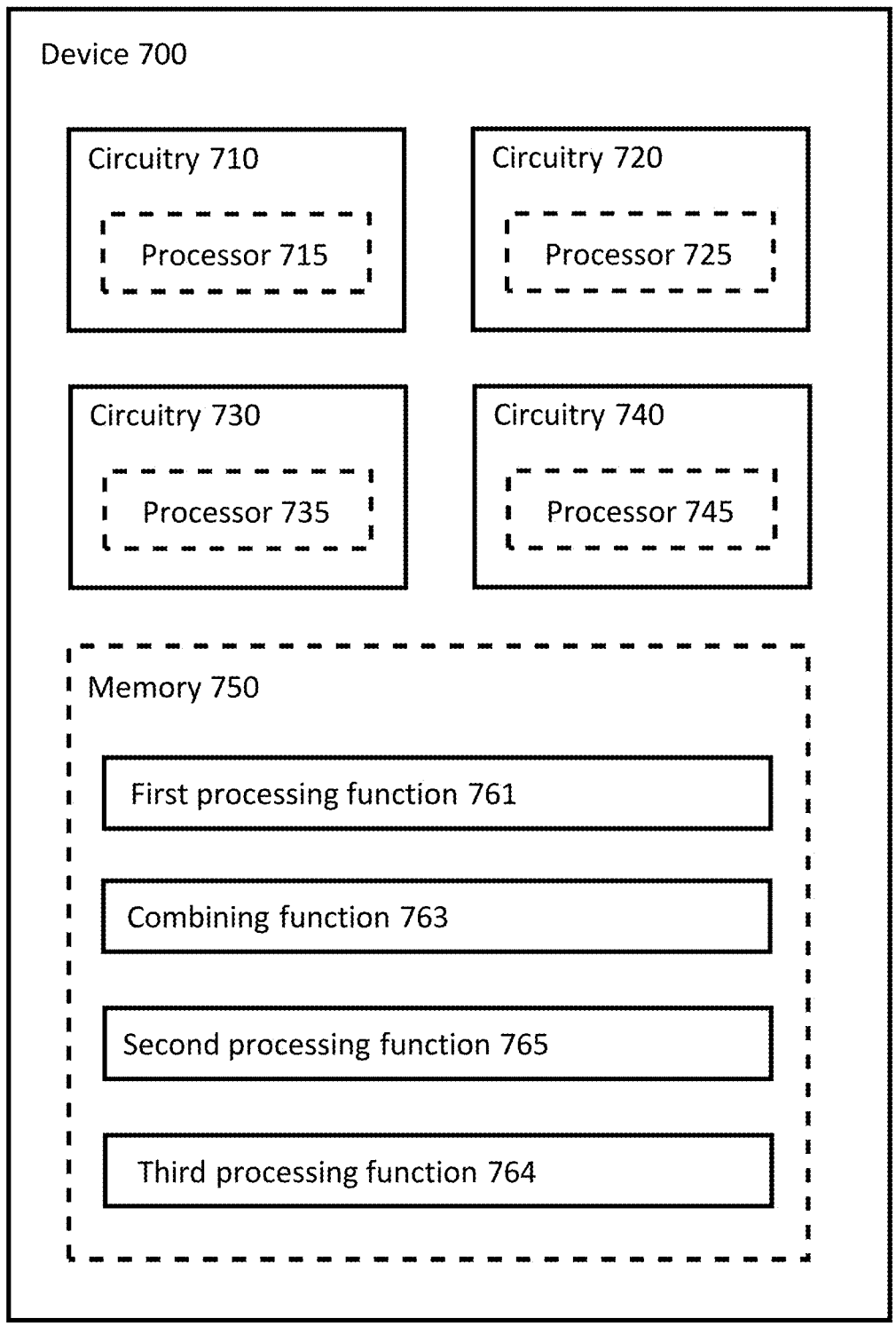
FIG. 7 is a schematic block diagram of embodiments of a device for processing image data representing a scene for extracting features related to objects in the scene using a convolutional neural network.

FIG. 7 is a schematic block diagram of further embodiments of a device 700 for processing image data representing a scene for extracting features related to objects in the scene using a convolutional neural network. Specifically, FIG. 6 relates to embodiments where there are four circuitries 710, 720, 730, 740. The device 700 is configured to execute a first processing function 761. The first processing function 761 is configured to process, by means of a respective one of the four circuitries 710, 720, 730, 740, four portions of the image data captured by a respective one of four image sensors and representing a respective one of four portions of the scene through the first number of layers of the convolutional neural network to form four intermediate outputs, wherein the four portions of the scene are partially overlapping. The first processing function 761 is further configured to combine two of the four intermediate outputs to a first intermediate combined output and the remaining two of the four intermediate outputs to a second intermediate combined output. The device 700 is further configured to execute a third processing function 764 configured to process, by means of two of the four circuitries 710, 720, 730, 740, a respective one of the first intermediate combined output and the second intermediate combined output through a third number of layers (referred to as "intermediate number of layers" in relation to FIG. 7) of the convolutional neural network to form a first output and a second output, respectively. The device 700 is further configured to execute a combining function 763 configured to combine the first output and the second output to a combined output. The device 700 is further configured to execute a second processing function 665 configured to process the combined output through a second number of layers (referred to as "last number of layers" in relation to FIG. 7) of the convolutional neural network by means of one of the four circuitries 710, 720, 730, 740 for extracting features related to objects in the scene. The device 700 may comprise a further circuitry (not shown) in addition to the four circuitries 710, 720, 730, 740. The second processing function 765 may then be configured to process the combined output through the second number of layers of the convolutional neural network by means of the further circuitry (not shown) for extracting features related to objects in the scene.

The four portions of the image data may relate to image data of one image of the scene. The image may have been captured by one image sensor or produced by combining images captured by more than one image sensor into one image analogously to what is described in relation to two portions of the image data in relation to FIG. 2.

Alternatively, the four portions of the image data may be image data captured by a respective one of four image sensors as described analogously to what is described in relation to two portions of the image data in relation to FIG. 2. In this alternative, the image data captured by the respective one of the first, second, third, and fourth image sensors need not be combined to one image first and then be divided into portions of the image data but may be used directly as a respective one of the first, second, third and fourth portions of the image data. Hence, there is no need for exchanging image data captured by the first, second, third, and fourth image sensors between the first, second, third, and fourth circuitries before processing through the first number of layers. Additionally, since the two combined intermediate outputs are processed by means of respective ones of the four circuitries through the intermediate number of layers of the convolutional neural network, the overlap between two of the four portions of the scene is larger than the other overlaps between portions of the four portions of the scene.

The four portions of the scene may each relate to a portion of the width of the wide scene. In such a case, there will be two peripheral portions of the scene and two central portions of the scene. In order to enable processing the image data through the first layers of the convolutional neural network on the four circuitries 710, 720, 730, 740 and then through third layers of the convolutional neural network on two circuitries of the four circuitries 710, 720, 730, 740, such as disclosed in relation to FIGS. 4a and 4b, the central portions of the scene are overlapping more than each of the peripheral portions of the scene are overlapping with the respective one of the central portions of the scene.

The four circuitries 710, 720, 730, 740 are configured to carry out functions of the device 700. The four circuitries 710, 720, 730, 740 may each include a processor 715, 725, 735, 745, such as a central processing unit (CPU), microcontroller, or microprocessor. The processors are configured to execute program code such as program code configured to carry out the functions of the device 700.

The device 700 may further comprise a memory 750. The memory 750 may be one or more of a buffer, a flash memory, a hard drive, a removable media, a volatile memory, a non-volatile memory, a random access memory (RAM), or another suitable device. In a typical arrangement, the memory 750 may include a non-volatile memory for long term data storage and a volatile memory that functions as system memory for the four circuitries 710, 720, 730, 740. The memory 750 may exchange data with the four circuitries 710, 720, 730, 740 over a data bus. Accompanying control lines and an address bus between the memory 750 and the four circuitries 710, 720, 730, 740 also may be present.

The functions of the device 700 may be embodied in the form of executable logic routines (e.g., lines of code, software programs, etc.) that are stored on a non-transitory computer readable medium (e.g., the memory 750) of the device 600 and are executed by the four circuitries 710, 720, 730, 740 (e.g., using processors 715, 725, 735, 745). Furthermore, the functions of the device 700 may be a standalone software application or form a part of a software application that carries out additional tasks related to the device 700. The described functions may be considered a method that processing units, e.g. the processors 715, 725, 735, 745 of the four circuitries 710, 720, 730, 740, are configured to carry out. Also, while the described functions may be implemented in software, such functionality may as well be carried out via dedicated hardware or firmware, or some combination of hardware, firmware and/or software.

The functions carried out by the device 700 and the four circuitries 710, 720, 730, 740 may be further adapted as corresponding steps of the method 300 described in relation to FIG. 3, and of the method 400 described in relation to FIGS. 4a and 4b.

Figure 8:
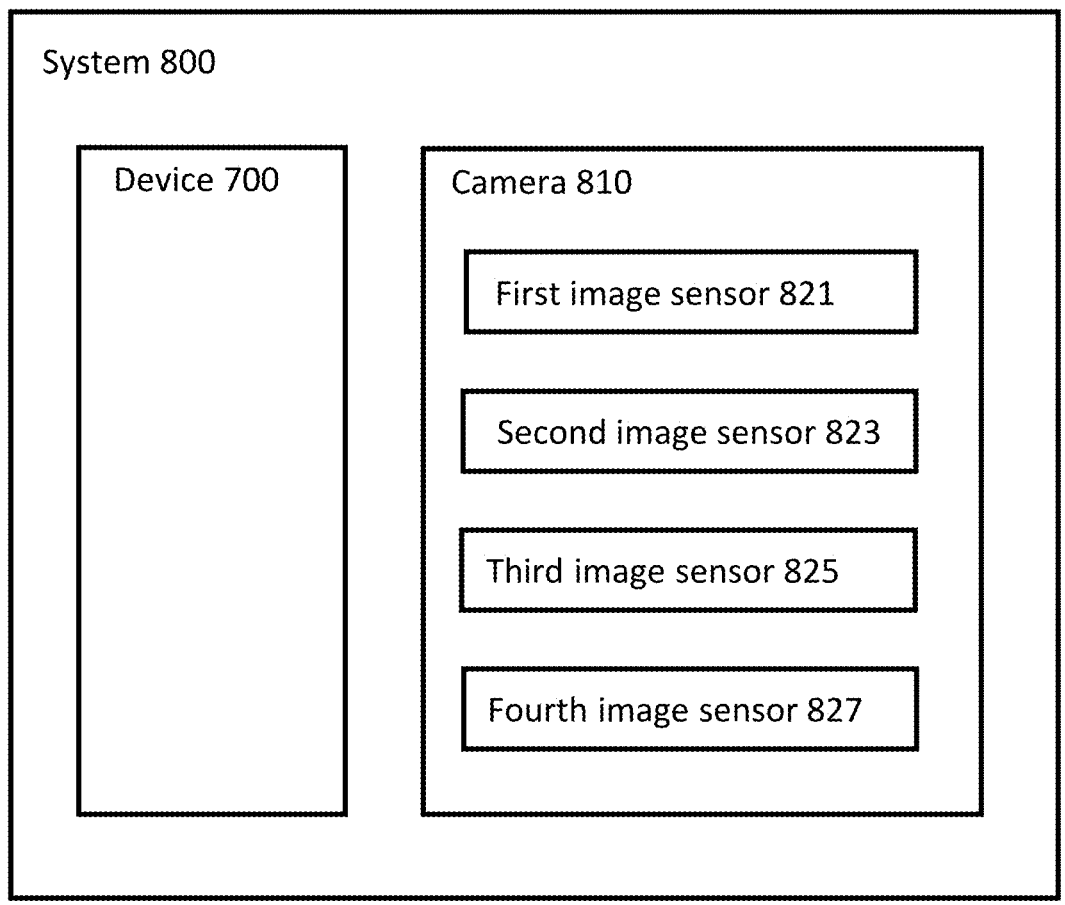
FIG. 8 is a schematic block diagram of embodiments of a system for capturing and processing image data representing a scene for extracting features related to objects in the scene using a convolutional neural network.
Figure 9:
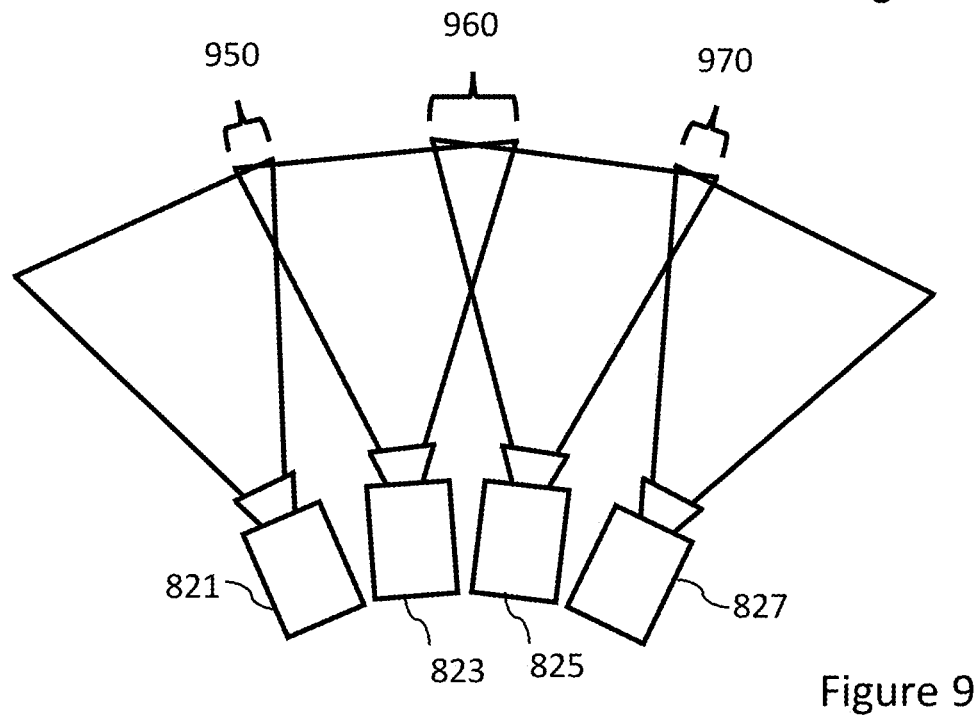
FIG. 9 is a schematic block diagram of embodiments of a system for capturing and processing image data representing a scene.

FIG. 8 is a schematic block diagram of embodiments of a system 800 for capturing and processing image data representing a scene for extracting features related to objects in the scene using a convolutional neural network. The system 800 comprises the device 700 as described in relation to FIG. 7. The system further comprises a camera 810 for capturing the image data representing the scene. The camera 810 comprises a first image sensor 821 arranged for capturing a first portion of the image data representing a first portion of the scene, a second image sensor 822 arranged for capturing a second portion of the image data representing a second portion of the scene, a third image sensor 823 arranged for capturing a third portion of the image data representing a third portion of the scene, and a fourth image sensor 824 arranged for capturing a fourth portion of the image data representing a fourth portion of the scene. The four image sensors 821, 822, 823, 824 are arranged such that the second and third portions of the scene are overlapping more than the first and second portions and more than the third and fourth portions. For example, the four image sensors 821, 822, 823, 824 may be arranged to capture a wide scene by arranging them to each capture a portion of the width of the wide scene, e.g. to then stich the captured image data of the four image sensors 821, 822, 823, 824 together to form a panoramic image. Such an arrangement is disclosed in FIG. 9. The first image sensor 821 and the fourth image sensor 827 will capture image data representing the two peripheral portions of the scene and the second image sensor 823 and the third image sensor 825 will capture image data representing the two central portions of the scene. In the arrangement, the image sensors are arranged such that the portions of the scene captured by the image sensors partially overlap in order to enable a more seamless combination of the image data from each sensor to a panoramic image. In order to enable processing the image data through first layers of a convolutional neural network on four circuitries and then through third layers of the convolutional neural network on two circuitries, such as disclosed in relation to FIGS. 4a and 4b, the four image sensors 821, 822, 823, 824 are arranged such that the central portions of the scene are overlapping more than each of the peripheral portions of the scene are overlapping with the respective one of the central portions of the scene. In other words, the partial overlap 960 between the second portion of the scene captured by the second image sensor 823 and the third portion of the scene captured by the third image sensor 825 is larger than the partial overlap 950 between the first portion of the scene captured by the first image sensor 821 and the second portion of the scene captured by the second image sensor 823 and the partial overlap 970 between the third portion of the scene captured by the third image sensor 825 and the fourth portion of the scene captured by the fourth image sensor 827. The image data captured by the respective one of the first, second, third, and fourth image sensors 821, 823, 825, 827 need not be combined to one image first and then be divided into portions of the image data but may be used directly as a respective one of the first, second, third and fourth portions of the image data. Hence, there is no need for exchanging image data captured the first, second, third, and fourth image sensors between the first, second, third, and fourth circuitries before processing through the first number of layers.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method of processing image data representing a scene for extracting features related to objects in the scene using a convolutional neural network, the method comprising:

processing, by means of a respective one of two or more circuitries, two or more portions of the image data representing a respective one of two or more portions of the scene through a first number of layers of the convolutional neural network to form two or more outputs, wherein the two or more portions of the scene are partially overlapping;

combining the two or more outputs to form a combined output by stitching the two or more outputs together and cropping image data relating to each overlapping part; and processing the combined output through a second number of layers of the convolutional neural network by means of one of the two or more circuitries for extracting features related to objects in the scene.

2. The method of claim 1, wherein the act of processing the two or more portions of the image data comprises:

processing, by means of a first circuitry, a first portion of the image data representing a first portion of the scene through the first number of layers of the convolutional neural network to form a first output; and processing, by means of a second circuitry, a second portion of the image data representing a second portion of the scene through the first number of layers of the convolutional neural network to form a second output, wherein the first and second portions of the scene are partially overlapping, wherein the act of combining the two or more outputs comprises:

combining the first and second outputs to form the combined output by stitching the first and second outputs together and cropping image data relating to the overlapping part, and wherein the act of processing the combined output comprises:

processing the combined output through the second number of layers of the convolutional neural network by means of one of the first and second circuitry for extracting features related to objects in the scene.

3. The method of claim 2, wherein the first portion of the image data is image data captured by a first image sensor and the second portion of the image data is image data captured by a second image sensor.

4. The method of claim 1, wherein the act of processing the two or more portions of the image data comprises:

processing, by means of a first circuitry, a first portion of the image data representing a first portion of the scene through the first number of layers of the convolutional neural network to form a first output;

processing, by means of a second circuitry, a second portion of the image data representing a second portion of the scene through the first number of layers of the convolutional neural network to form a second output, wherein the first and second portions of the scene are partially overlapping, processing, by means of a third circuitry, a third portion of the image data representing a third portion of the scene through the first number of layers of the convolutional neural network to form a third output, wherein the second and third portions of the scene are partially overlapping; and processing, by means of a fourth circuitry, a fourth portion of the image data representing a fourth portion of the scene through the first number of layers of the convolutional neural network to form a fourth output, wherein the third and fourth portions of the scene are partially overlapping,
wherein the act of combining the two or more outputs comprises:
combining the first, second, third and fourth outputs from the processing of the first and second portions of the image data to form the combined output by stitching the first, second, third and fourth output together and cropping image data relating to each overlapping part, and
wherein the act of processing the combined output comprises:
processing the combined output through the second number of layers of the convolutional neural network by means of one of the first, second, third and fourth circuitry for extracting features related to objects in the scene.

5. The method of claim 1, wherein the act of processing the two or more portions of the image data comprises:
processing, by means of a first circuitry, a first portion of the image data representing a first portion of the scene through the first number of layers of the convolutional neural network to form a first intermediate output;
processing, by means of a second circuitry, a second portion of the image data representing a second portion of the scene through the first number of layers of the convolutional neural network to form a second intermediate output, wherein the first and second portions of the scene are partially overlapping;
combining the first and second intermediate outputs from the processing of the first and second portions of the image data to form a first intermediate combined output by stitching the first and second intermediate outputs together and cropping image data relating to the overlapping part of the first portion of the image data;
processing, by means of a third circuitry, a third portion of the image data representing a third portion of the scene through the first number of layers of the convolutional neural network to form a third intermediate output, wherein the second and third portions of the scene are partially overlapping;
processing, by means of a fourth circuitry, a fourth portion of the image data representing a fourth portion of the scene through the first number of layers of the convolutional neural network to form a fourth intermediate output, wherein the third and fourth portions of the scene are partially overlapping;
combining the third and fourth intermediate outputs from the processing of the third and fourth portions of the image data to form a second intermediate combined output by stitching the third and fourth intermediate outputs together and cropping image data relating to the overlapping part of the third portion of the image data;
processing, by means of one of the first, second, third and fourth circuitries, the first intermediate combined output through a third number of layers of the convolutional neural network to form a first output; and
processing, by means of a different one of the first, second, third and fourth circuitries, the second intermediate combined output through the third number of layers of the convolutional neural network to form a second output,
wherein the act of combining the two or more outputs comprises:
combining the first and second outputs to form the combined output by stitching the first and second intermediate combined outputs together and cropping image data relating to the overlapping part of the first intermediate combined output, and
wherein the act of processing the combined output comprises:
processing the combined output through the second number of layers of the convolutional neural network by means of one of the first, second, third and fourth circuitry for extracting features related to objects in the scene.

6. The method of claim 5, wherein the first portion of the image data is image data captured by a first image sensor, the second portion of the image data is image data captured by a second image sensor, the third portion of the image data is image data captured by a third image sensor, and the fourth portion of the image data is image data captured by a fourth image sensor, and wherein the second and third portions of the scene are overlapping more than the first and second portions and more than the third and fourth portions.

7. The method of claim 1, wherein the image data are image data captured by one image sensor.

8. The method of claim 1, wherein the image data are image data captured by at least two image sensors.

9. The method of claim 8, wherein each portion of the image data is captured by a separate image sensor of the at least two image sensors, and wherein the at least two image sensors are arranged such that image data representing respective portions of the scene that are partially overlapping are captured.

10. The method of claim 1, wherein the first number of layers and a filter size of each overlap are selected such that processing the first number of layers is encompassed.

11. A non-transitory computer-readable storage medium having stored thereon instructions for implementing the method according to claim 1, when executed by a device having processing capabilities.

12. A device for processing image data representing a scene for extracting features related to objects in the scene using a convolutional neural network, the device comprising two or more circuitries configured to execute:
a first processing function configured to process, by means of a respective one of the two or more circuitries, two or more portions of the image data representing a respective one of two or more portions of the scene through a first number of layers of the convolutional neural network to form two or more outputs, wherein the two or more portions of the scene are partially overlapping;
a combining function configured to combine the two or more outputs to form a combined output by stitching the two or more outputs together and cropping image data relating to each overlapping part; and
a second processing function configured to process the combined output through a second number of layers of the convolutional neural network by means of one of the two or more circuitries for extracting features related to objects in the scene.

13. The device of claim 12, wherein the image data are image data captured by one image sensor or by at least two image sensors.

14. The device of claim 12, wherein
the device comprises four or more circuitries,
the first processing function is further configured to:
process, by means of a respective one of the four or more circuitries, four portions of the image data captured by a respective one of four image sensors and representing a respective one of four portions of the scene through the first number of layers of the convolutional neural network to form four intermediate outputs, wherein the four portions of the scene are partially overlapping; and combine two of the four intermediate outputs to a first intermediate combined output and the remaining two of the four intermediate outputs to a second intermediate combined output by stitching the four or more outputs together and cropping image data relating to each overlapping part;

and the device is further configured to execute:

a third processing function configured to process, by means of two of the four or more circuitries, a respective one of the first intermediate combined output and the second intermediate combined output through a third number of layers of the convolutional neural network to form a first output and a second output, respectively.

15. A system for capturing and processing image data representing a scene for extracting features related to objects in the scene using a convolutional neural network, comprising:

the device according to claim 14; and a camera for capturing the image data representing the scene, the camera comprising:

a first image sensor arranged for capturing a first portion of the image data representing a first portion of the scene;

a second image sensor arranged for capturing a second portion of the image data representing a second portion of the scene;

a third image sensor arranged for capturing a third portion of the image data representing a third portion of the scene;

a fourth image sensor arranged for capturing a fourth portion of the image data representing a fourth portion of the scene, wherein the first, second, third and fourth image sensors are arranged such that the second and third portions of the scene are overlapping more than the first and second portions and more than the third and fourth portions.

* * * * *